March 13, 1934.   G. W. SNELL   1,950,933
FLOAT FOR FISHING TACKLE
Filed June 10, 1932
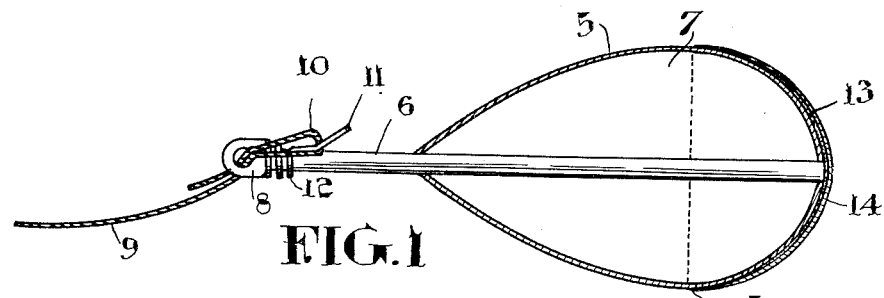
FIG.1
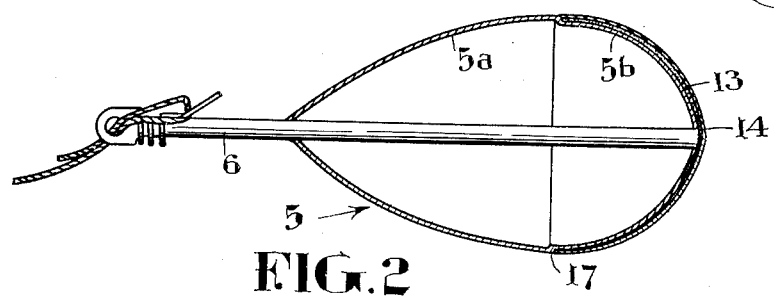
FIG.2
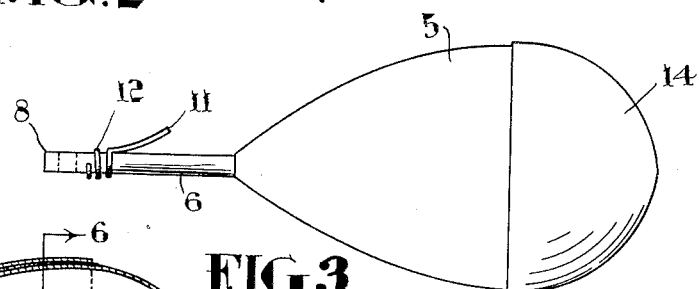
FIG.3
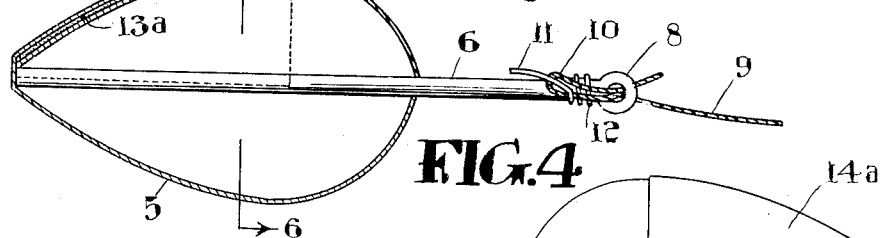
FIG.4
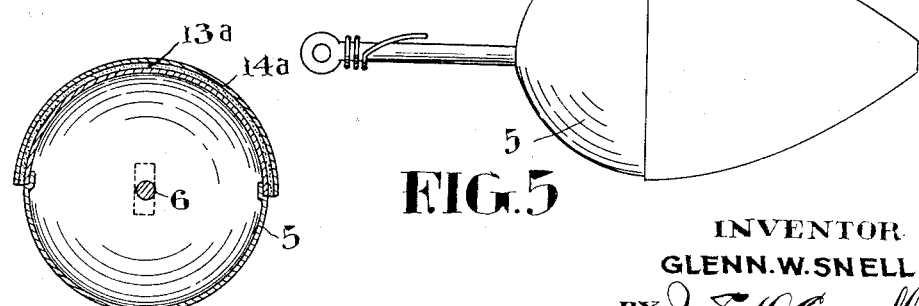
FIG.5
FIG.6
INVENTOR
GLENN.W.SNELL
BY J.S.O'Connell
ATTORNEY Patented Mar. 13, 1934

1,950,933

UNITED STATES PATENT OFFICE 1,950,933

FLOAT FOR FISHING TACKLE

Glenn W. Snell, Montreal, Quebec, Canada

Application June 10, 1932, Serial No. 616,509

1 Claim. (Cl. 43—49)

This invention relates to floats for fishing tackle and the object is to provide a luminous float of comparatively simple and inexpensive construction in which novel provision is made for protecting a luminous paint or compound applied to the body of the float.

More particularly, the present invention resides in providing a hollow float body having its ends secured in a watertight manner to a float rod passing axially therethrough, a portion of the outer surface of the body being rendered luminous by the application of a coating of luminous paint or compound which is sealed between the body and a separately formed transparent cap applied to cover the coated portion.

Proceeding now to a more detailed description of the invention reference will be had to the accompanying drawing wherein—

Fig. 1 is a longitudinal sectional view through one form of float constructed in accordance with this invention, the float rod being shown in elevation.

Fig. 2 is a view similar to Fig. 1 but showing a slight modification.

Fig. 3 is an elevation of the float construction shown in Fig. 1.

Fig. 4 is a view similar to Figs. 1 and 2 but showing a further modification.

Fig. 5 is an elevation of a float constructed as shown in Fig. 4.

Fig. 6 is a transverse sectional view along the line 6—6 of Fig. 4.

In the construction shown in Fig. 1 the body portion of the float comprises a hollow shell 5 which may be made of celluloid or any suitable transparent or translucent material molded or otherwise formed to the desired shape. In the present instance the body portion 5 is cylindrical in cross section and substantially ovaliform in longitudinal section and has its ends secured in a watertight manner to a float rod 6 extending axially therethrough so that the interior of the body portion constitutes a sealed air chamber 7. One end of the float rod 6 (which may also be made of celluloid or similar light material) projects a substantial distance beyond the body portion 5 and is formed to provide an eye 8. A portion of the fishing line 9 is extended through this eye in the form of a loop 10 which is caught between the rod and a spring hook 11, the latter constituting one terminal of a piece of spring wire which is tightly carried around the float rod as indicated at 12.

The outer surface of the body portion 5 at and adjacent the large end of said body is covered by a coating 13 of luminous paint or other luminous compound applied in any suitable manner. This coated portion of the body is protected by a cup shaped cap 14 which is fitted thereon and has its marginal portion 15 secured to the body by any suitable form of waterproof adhesive. The body portion 5 and the cap 14 may be shaped so that the clearance reserved between them will accommodate a luminous coating 13 of any desired thickness and the said cap 14 is made of transparent celluloid or any other waterproof transparent material.

The construction shown in Fig. 2 is the same as that described in connection with Fig. 1 except for the fact that the body portion 5 is formed to provide merging portions 5a and 5b of different radius resulting in the formation of an intermediate shoulder 17 which serves as an abutment for the marginal portions 16 of the cap 14.

In the construction shown in Figs. 4 to 6 inclusive the shell or body portion 5 is attached to the float rod 6 so that the positions of the small and large ends of the body are reversed as compared with the arrangement shown in the preceding figures. In this last modification the luminous coating 13a and the transparent protecting cap 14a are applied to cover only one half of the body in the circumferential direction and to extend longitudinally from the small end to an intermediate point spaced from the larger end of the body.

Having thus described my invention, what I claim is:—

A luminous float for fishing tackle comprising a hollow body substantially ovaliform in longitudinal section, said body comprising merging portions of different radius affording an external shoulder extending around the outer surface of the body intermediate its ends, the portion of smaller radius at one side of said shoulder being completely covered with a luminous coating and a hollow cap applied to cover the coated portion of the body and having its edge secured to the body at said shoulder.

GLENN W. SNELL.